United States Patent
Hackeloeer et al.

(10) Patent No.: US 12,078,496 B2
(45) Date of Patent: Sep. 3, 2024

(54) METHOD FOR DETERMINING WHETHER A MOTOR VEHICLE HAS DRIVEN ON A ROAD INCLUDED IN DIGITAL MAP MATERIAL

(71) Applicant: Bayerische Motoren Werke Aktiengesellschaft, Munich (DE)

(72) Inventors: Andreas Hackeloeer, Munich (DE); Stefan Holder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 197 days.

(21) Appl. No.: 17/646,408

(22) Filed: Dec. 29, 2021

(65) Prior Publication Data
US 2022/0244059 A1    Aug. 4, 2022

(30) Foreign Application Priority Data
Feb. 4, 2021    (DE) ............... 10 2021 102 652.0

(51) Int. Cl.
*G01C 21/34* (2006.01)
*G01C 21/00* (2006.01)
(Continued)

(52) U.S. Cl.
CPC ......... *G01C 21/3461* (2013.01); *G01C 21/30* (2013.01); *G01C 21/3804* (2020.08); *G07C 5/04* (2013.01)

(58) Field of Classification Search
CPC ............ G01C 21/3461; G01C 21/30; G01C 21/3804; G01C 21/3819; G01C 21/3844;
(Continued)

(56) References Cited

U.S. PATENT DOCUMENTS 11,099,561 B1 * 8/2021 Kentley-Klay ..... B60W 50/082
11,720,094 B2 * 8/2023 Chen ................... G05D 1/0088
                                                           701/2
(Continued)

FOREIGN PATENT DOCUMENTS

DE    10 2005 008 185 A1    8/2006
DE    11 2013 002 772 T5    3/2015
(Continued)

OTHER PUBLICATIONS

German-language Office Action issued in German Application No. 10 2021 102 652.0 dated Sep. 13, 2021 (six (6) pages).

*Primary Examiner* — Abdalla A Khaled
(74) *Attorney, Agent, or Firm* — Crowell & Moring LLP

(57) ABSTRACT

Methods, systems, and electronic control units are provided. It is determined whether a motor vehicle has driven on a road included in digital map material. First absolute position data is captured relating to the motor vehicle using an absolute positioning system and capturing first vehicle odometry data using an odometry system of the motor vehicle at a first point in time during operation of the motor vehicle. Further absolute position data is captured relating to the motor vehicle using the absolute positioning system and capturing further vehicle odometry data using the odometry system at one further point in time during operation of the motor vehicle which differs from the first point in time. It is determined whether the motor vehicle has driven on a road included in digital map material based on the digital map material, the captured data, and a map-matching algorithm.

15 Claims, 3 Drawing Sheets

(51) Int. Cl.
*G01C 21/30* (2006.01)
*G07C 5/04* (2006.01)

(58) Field of Classification Search
CPC ......... G01C 22/00; G07C 5/04; B60W 40/02; G08G 1/0968
See application file for complete search history.

(56) References Cited

U.S. PATENT DOCUMENTS

| | | | | |
|---|---|---|---|---|
| 2007/0213927 A1* | 9/2007 | Ishigami | ................ | G01C 21/26 701/417 |
| 2008/0065327 A1* | 3/2008 | Sobue | ................ | G01C 21/3844 340/441 |
| 2010/0057352 A1* | 3/2010 | Nakae | .................... | G01C 21/32 701/532 |
| 2010/0179755 A1* | 7/2010 | Kohno | ................ | G01C 21/3815 701/532 |
| 2011/0047338 A1* | 2/2011 | Stahlin | ............... | G01C 21/3848 711/E12.001 |
| 2011/0172913 A1* | 7/2011 | Nakamura | ......... | G01C 21/3811 701/532 |
| 2011/0238294 A1* | 9/2011 | Shikimachi | ........ | G01C 21/3837 701/533 |
| 2014/0046582 A1* | 2/2014 | Tijink | ................ | G01C 21/3844 701/411 |
| 2014/0278055 A1* | 9/2014 | Wang | .................... | G16B 99/00 701/409 |
| 2015/0142306 A1* | 5/2015 | Kanematsu | ........ | G01C 21/3837 701/461 |
| 2017/0016731 A1* | 1/2017 | Koshiba | ............. | G01C 21/3815 |
| 2018/0188036 A1* | 7/2018 | Hasberg | ............. | G01C 21/3837 |
| 2019/0243375 A1* | 8/2019 | Stenneth | ............. | G01C 21/3811 |
| 2019/0362162 A1* | 11/2019 | Averbuch | ........... | G01C 21/3815 |
| 2019/0362198 A1* | 11/2019 | Averbuch | ............... | G01S 13/931 |
| 2020/0019627 A1* | 1/2020 | Stenneth | .................. | G06T 7/70 |
| 2020/0160068 A1* | 5/2020 | Silver | ................... | G06V 10/764 |
| 2020/0167575 A1* | 5/2020 | Nayak | .................... | G06N 20/00 |
| 2020/0310450 A1* | 10/2020 | Reschka | ............. | G01C 21/3815 |
| 2021/0207969 A1* | 7/2021 | Bang | ................. | B60W 30/0956 |
| 2023/0150540 A1* | 5/2023 | Kim | ................... | B60W 30/143 701/25 |
| 2023/0168102 A1* | 6/2023 | Kim | ................... | G01C 21/3647 701/437 |
| 2023/0278555 A1* | 9/2023 | Kim | ................. | G08G 1/096741 701/41 |

FOREIGN PATENT DOCUMENTS

DE    10 2017 213 983 A1    2/2019
WO    WO 2009/133185 A1    11/2009

* cited by examiner

METHOD FOR DETERMINING WHETHER A MOTOR VEHICLE HAS DRIVEN ON A ROAD INCLUDED IN DIGITAL MAP MATERIAL

CROSS REFERENCE TO RELATED APPLICATION

This application claims priority under 35 U.S.C. § 119 from German Patent Application No. 10 2021 102 652.0, filed Feb. 4, 2021, the entire disclosure of which is herein expressly incorporated by reference.

BACKGROUND AND SUMMARY OF THE INVENTION

The present subject matter relates to a method for determining whether a motor vehicle has driven on a road included in digital map material, which method makes it possible for new roads which are not included in digital map material to also be able to be reliably identified when the distance between the new road not included in the digital map material and a road included in the digital map material is short.

Driver assistance systems for assisting a driver when driving a motor vehicle and navigation systems for guiding a driver or a motor vehicle to a destination may use digital maps.

With the continuously increasing complexity of driver assistance systems, highly accurate digital map material is continuously increasing in importance in this case. Highly accurate digital maps may provide information on the exact course of the road, may assist with interpreting the situation and deciding on a behavior and may be of great benefit for precisely and robustly locating the vehicle itself. However, the disadvantage of this is that digital map material is quickly out of date, for example as a result of the construction of new roads.

This is important in the case of autonomous driving functions, for example. It is thus an enormous safety risk if an autonomously driving vehicle is driving on a new road which is not included in digital map material used by the autonomously driving vehicle and, in particular, if the situation were incorrectly interpreted as if the autonomously driving vehicle were driving on an adjacent road included in the digital map material.

Data from an absolute positioning system of a motor vehicle, for example position data obtained using a global navigation satellite system (GNSS), are usually used in this case to detect whether the motor vehicle is on or has traveled on a road included in digital map material and to identify new roads which have not been previously included in the digital map material. The vehicle positions determined using a GNSS receiver are mapped in this case to the road network of the digital map, for example using map-matching methods. However, the disadvantage of this is that, as a result, unknown roads which are not included in the digital map material can be reliably identified only when they are at a great distance of more than 100 m, for example, from already known roads which are included in the digital map material. However, if the distance to known roads is short and is less than 100 m, for example, it cannot be reliably determined whether the motor vehicle is or has been on a road included in the digital map material.

The document WO 2009/133185 A1 discloses a self-learning map and an apparatus for creating and storing a digital map for a means of transport on the basis of environmental sensors, vehicle-to-X communication and satellite navigation systems, in which case no navigation map data are used for this purpose. The digital map created is also iteratively improved and can be used to check the validity of an already existing digital map for a driver assistance system.

The object of embodiments of the present subject matter is to specify a method for determining whether a motor vehicle has driven on a road included in digital map material, which method makes it possible for new roads which are not included in the digital map material to also be able to be reliably identified when the distance between the new road not included in the digital map material and a road included in the digital map material is short.

According to one embodiment of the present subject matter, this object is achieved using a method for determining whether a motor vehicle has driven on a road included in digital map material, wherein first absolute position data relating to the motor vehicle are captured using an absolute positioning system and first vehicle odometry data are captured using an odometry system of the motor vehicle at a first point in time during operation of the motor vehicle, and further absolute position data relating to the motor vehicle are captured using the absolute positioning system and further vehicle odometry data are captured using the odometry system at at least one further point in time during operation of the motor vehicle which differs from the first point in time. It is then determined whether the motor vehicle has driven on a road included in digital map material on the basis of the digital map material, the first absolute position data, the first vehicle odometry data, the further absolute position data and the further vehicle odometry data as well as a map-matching algorithm.

In this case, digital map material is understood as meaning map material which is present in digital form and contains geometrical, topological and semantic information relating to a road network and can be used and processed by a navigation system of the motor vehicle and driver assistance systems of the motor vehicle. In this case, the digital map material may also be augmented with further information such as speed information, for example speed limits, or warnings. In this case, the digital map material can be updated. The fact that a road is included in the digital map material means in this case that the road is included in the road network contained in the digital map material; in particular geometrical, but possibly also topological or semantic, information relating to this road is included in the digital map material.

Absolute position data also indicate the measured position of the motor vehicle at a particular point in time in absolute values, for example in a UTM or WGS84 reference coordinate system. In this case, the absolute position data may furthermore also be optionally provided with an orientation indicating a current direction of movement of the motor vehicle, for example. A combination of position and orientation is often referred to here as a pose. Corresponding absolute positioning systems may be in this case, for example, satellite-based technologies, for example a Global Positioning System (GPS) or GNSS.

In the case of motor vehicles, odometry is also understood as meaning a functionality which determines the position, orientation and driving state of the motor vehicle at particular points in time. In this case, measurement variables from the chassis, for example wheel rotation and direction, of the yaw rate sensor and of the steering system, for example wheel steering angle or steering wheel angle, are generally used as input variables. In vehicle navigation, odometry is used in addition to determining an absolute position in order to bridge regions without reception, such as tunnel sections, and to refine the GPS results. In this case, an odometry system is also understood as meaning a system for capturing the corresponding input variables, for example the input variables cited above.

The fact that the motor vehicle has driven on a road included in the digital map material or on a road not included in the digital map material in this case means that, at at least one point in time at which absolute position data and vehicle odometry data were captured, the motor vehicle has driven on the corresponding road and is still driving on the corresponding road or has left the corresponding road again in the meantime.

As a result of the fact that vehicle odometry data are also used in addition to absolute position data to identify roads which are not included in the digital map material, for example newly constructed roads, the identification accuracy when identifying such roads can be increased considerably, in particular in those cases in which a new or unknown road runs in the vicinity of a known road included in the digital map material. The reason for this improvement is that the vehicle odometry has a considerably higher degree of accuracy of the distance covered than the absolute positions. In particular, the method makes it possible in the first place to automatically identify new, unknown roads which run in the vicinity of known roads included in the digital map material. In addition, the fact that errors of successive absolute positions, for example GNSS positions, are not independent of one another, but rather the positions often have a constant offset, has a positive effect on the identification. This identification can then be used to initiate safety-critical situations, for example if autonomously driving motor vehicles are driving on unknown roads, in which case appropriate responses which avoid the safety-critical situation can be initiated on the basis of this identification.

In particular, the method may in this case also comprise initiating a safety-oriented action if it is determined that the motor vehicle has not driven on a road included in the digital map material in order to immediately react to potential safety-critical responses and to avoid them. For example, appropriate warnings can be output in order to accordingly warn the driver of the motor vehicle and to increase his attentiveness to the situation, or the functions of individual driver assistance systems can be restricted or deactivated, for example autonomous driving functions can be deactivated on unknown roads not included in the digital map material.

In one embodiment, the step of determining whether the motor vehicle has driven on a road included in the digital map material comprises determining an optimum route between a position indicated by the first absolute position data and a position indicated by second absolute position data on the basis of the digital map material, wherein the second absolute position data are included in the further absolute position data; the second absolute position data were captured at at least one further point in time during operation of the motor vehicle which differs from the first point in time, determining a route length of the optimum route on the basis of the digital map material, and determining an actually covered distance on the basis of the first vehicle odometry data and second vehicle odometry data, wherein the second vehicle odometry data were captured at the same point in time as the second absolute position data. It is then determined whether the motor vehicle has driven on a road included in the digital map material by comparing the route length with the actually covered distance, wherein it is determined that the motor vehicle has not driven on a road included in the digital map material if the route length differs greatly from the actually covered distance.

The fact that the route length differs greatly from the actually covered distance means in this case that the route length differs from the actually covered distance by more than just a small value, in particular by a value outside a corresponding confidence interval.

The optimum route may also in this case be, in particular, a shortest or quickest route between the position indicated by the first absolute position data and the position indicated by the second absolute position data, as determined by a navigation system on the basis of the digital map material. In this case, it is advantageous to determine the quickest route if the positions corresponding to the first and second absolute position data have a large interval of time and are at a large spatial distance from one another.

Overall, it is therefore possible to determine in a simple manner with little computing power and a short computing duration, which is necessary in order to be able to react as immediately as possible to safety-critical situations, whether the motor vehicle has driven on a road included in the digital map material.

In this case, the route length may differ greatly from the actually covered distance if a difference between the route length and the actually covered distance is greater than or equal to 20 m. A difference of 20 m, more specifically, a determined longitudinal offset in the digital map material of 20 m or more, for a conventional road width of between 2 m and 5 m is thus a reliable indicator or indication of a new, unknown road. In this case, the fact that the route length differs greatly from the actually covered distance if a difference between the route length and the actually covered distance is greater than or equal to 20 m is only one example embodiment, however. Rather, this value may also vary, for example on the basis of the accuracy of the absolute positioning system used.

Furthermore, the further absolute position data and further vehicle odometry data may be captured every 10 s after the first point in time during operation of the motor vehicle. The accuracy when determining whether the vehicle is driving on a road included in the digital map material can be increased further using an appropriately high frequency when capturing the absolute position data and the vehicle odometry.

In addition, the method may also comprise checking whether the first and the further absolute position data each indicate positions which are in the immediate vicinity of a road included in the digital map material, wherein the step of determining whether the motor vehicle has driven on a road included in the digital map material is carried out only if the first and the further absolute position data do not each indicate positions which are in the immediate vicinity of a road included in the digital map material.

The fact that the respective positions are each in the immediate vicinity of a road included in the digital map material in this case means that the corresponding distances are each within an acceptable error tolerance based on the measurement accuracy of the absolute positioning system used and are less than or equal to 10 m, for example.

As a result of the fact that the step of determining whether the motor vehicle has driven on a road included in the digital map material is carried out only if the first and the further absolute position data do not each indicate positions which are in the immediate vicinity of a road included in the digital map material, the computing power when determining whether a motor vehicle has driven on a road included in digital map material can be reduced further, in particular to such an extent that the method can also be carried out completely by conventional electronic control units and corresponding processors included in a motor vehicle.

A further embodiment of the present subject matter also specifies a method for updating digital map material, wherein it is determined whether a first motor vehicle has driven on a road included in digital map material by carrying out a method described above, wherein, if it is determined that the first motor vehicle has not driven on a road included in the digital map material, the road on which the first motor vehicle has actually driven is captured and the digital map material is updated on the basis of the capture of the road on which the first motor vehicle has actually driven.

The fact that the road on which the first motor vehicle has actually driven is captured in this case means that this is measured using further measures in order to then be entered in the digital map material. In this case, motor vehicles having further sensors, for example a Differential Global Positioning System (DPGS), can be used for the accurate measurement, for example.

A method is therefore specified which makes it possible for new roads not included in digital map material to also be able to be reliably identified and for the digital map material to be able to be accordingly updated when the distance between the new road not included in the digital map material and a road included in the digital map material is short. As a result of the fact that new, unknown roads which are at a short distance from a road included in the digital map material can also be entered in the digital map material, safety-critical situations can be reliably prevented if other motor vehicles drive on the new road in future, and driver assistance systems, for example, can use and process the updated digital map material.

In this case, the digital map material can be updated if it is determined that at least one further vehicle has also driven on the road on which the first motor vehicle has actually driven and it is determined that the at least one further motor vehicle has driven on a road not included in the digital map material. The fact that a plurality of motor vehicles first of all drive on the new road not included in the digital map material and accordingly determine this road before it is entered in the digital map material is a reliable indicator of the fact that a new, unknown road which is not included in the digital map material is actually present. The accuracy of the method for updating digital map material can therefore be increased further.

A further embodiment of the present subject matter furthermore also specifies an electronic control unit for determining whether a motor vehicle has driven on a road included in digital map material, wherein the electronic control unit has a receiver which is designed to receive absolute position data relating to the motor vehicle which are captured at a first point in time during operation of the motor vehicle, vehicle odometry data relating to the motor vehicle which are captured at the first point in time, absolute position data which are captured at at least one further point in time during operation of the motor vehicle which differs from the first point in time and vehicle odometry data which are captured at the at least one further point in time, and a determination unit which is designed to determine whether the motor vehicle has driven on a road included in digital map material on the basis of the digital map material, the first absolute position data, the first vehicle odometry data, the further absolute position data and the further vehicle odometry data as well as a map-matching algorithm.

An electronic control unit is therefore specified which makes it possible for new roads not included in digital map material to also be able to be reliably identified when the distance between the new road not included in the digital map material and a road included in the digital map material is short. As a result of the fact that vehicle odometry data are also used in addition to absolute position data to identify roads not included in the digital map material, for example newly constructed roads, the identification accuracy when identifying such roads can thus be increased considerably, in particular in those situations in which a new or unknown road runs in the vicinity of a known road included in the digital map material. The reason for this improvement is that the vehicle odometry has a considerably higher degree of accuracy of the distance covered than the absolute positions. In particular, the electronic control unit makes it possible in the first place to automatically identify new, unknown roads which run in the vicinity of known roads included in the digital map material. In addition, the fact that errors of successive absolute positions, for example GNSS positions, are not independent of one another, but rather the positions often have a constant offset, has a positive effect on the identification. This identification can then be used to initiate safety-critical situations, for example if autonomously driving motor vehicles are driving on unknown roads, wherein appropriate responses which avoid the safety-critical situation can be initiated on the basis of this identification.

In this case, the electronic control unit may furthermore also have an initiation unit which is designed to initiate a safety-oriented action if it is determined in the determination unit that the motor vehicle has not driven on a road included in the digital map material in order to immediately react to potential safety-critical responses and to avoid them. The initiation unit may be in this case, for example, a warning device in order to output appropriate warnings in order to accordingly warn the driver of the motor vehicle, or an actuator which is designed to restrict or deactivate the functions of individual driver assistance systems, for example to deactivate autonomous driving functions on unknown roads not included in the digital map material.

In one embodiment, the determination unit may also have a first unit which is designed to determine an optimum route between a position of the motor vehicle indicated by the first absolute position data and a position of the motor vehicle indicated by second absolute position data on the basis of the digital map material, wherein the second absolute position data are included in the further absolute position data, a second unit which is designed to determine a route length of the optimum route on the basis of the digital map material, a third unit which is designed to determine an actually covered distance on the basis of the first vehicle odometry data and second vehicle odometry data, wherein the second vehicle odometry data are captured at the same point in time as the second absolute position data, and a fourth unit which is designed to determine whether the motor vehicle has driven on a road included in the digital map material by comparing the route length with the actually covered distance, wherein the fourth unit is designed to determine that the motor vehicle has not driven on a road included in the digital map material if the route length differs greatly from the actually covered distance.

The optimum route may again in this case be, in particular, a shortest or quickest route between the position of the motor vehicle indicated by the first absolute position data and the position of the motor vehicle indicated by the second absolute position data, as determined by a navigation system on the basis of the digital map material. In this case, it is advantageous to determine the quickest route if the positions corresponding to the first and the second absolute position data have a large interval of time or are at a large spatial distance from one another.

Overall, an electronic control unit is therefore specified which makes it possible to determine in a simple manner with little computing power and a short computing duration, which is necessary in order to be able to react as immediately as possible to safety-critical situations, whether the motor vehicle has driven on a road included in the digital map material.

In this case, the route length may differ greatly from the actually covered distance if a difference between the route length and the actually covered distance is greater than or equal to 20 m. A difference of 20 m, specifically, a determined longitudinal offset in the digital map material of 20 m or more, for a conventional road width of between 2 m and 5 m is thus a reliable indicator or indication of a new, unknown road. In this case, the fact that the route length differs greatly from the actually covered distance if a difference between the route length and the actually covered distance is greater than or equal to 20 m is only one example embodiment, however. Rather, this value may also vary, for example on the basis of the accuracy of the absolute positioning system used.

In addition, the electronic control unit may also have a checking unit which is designed to check whether the first and the further absolute position data each indicate positions which are each in the immediate vicinity of a road included in the digital map material, wherein the determination unit is designed only to determine whether the motor vehicle has driven on a road included in the digital map material if the first and the further absolute position data each do not indicate positions which are in the immediate vicinity of a road included in the digital map material.

The fact that the respective positions are each in the immediate vicinity of a road included in the digital map material again in this case means that the corresponding distances are each within an acceptable error tolerance based on the measurement accuracy of the absolute positioning system used and are less than or equal to 10 m, for example.

As a result of the fact that the determination unit is designed only to determine whether the motor vehicle has driven on a road included in the digital map material if the first and the further absolute position data do not each indicate positions which are in the immediate vicinity of a road included in the digital map material, the computing power when determining whether a motor vehicle has driven on a road included in digital map material can be reduced further, in particular to such an extent that the method can also be completely carried out by conventional control units and corresponding processors included in a motor vehicle.

A further embodiment of the present subject matter furthermore also specifies a motor vehicle which has an electronic control unit described above.

A motor vehicle is therefore specified having an electronic control unit which makes it possible for new roads not included in digital map material to also be able to be reliably identified when the distance between the new road not included in the digital map material and a road included in the digital map material is short. As a result of the fact that vehicle odometry data are also used in addition to absolute position data to identify roads not included in the digital map material, for example newly constructed roads, the identification accuracy when identifying such roads can be increased considerably, in particular in those situations in which a new or unknown road runs in the vicinity of a known road included in the digital map material. The reason for this improvement is that the vehicle odometry has a considerably higher degree of accuracy of the distance covered than the absolute positions. In particular, the electronic control unit makes it possible in the first place to automatically identify new, unknown roads which run in the vicinity of known roads included in the digital map material. In addition, the fact that errors of successive absolute positions, for example GNSS positions, are not independent of one another, but rather the positions often have a constant offset, has a positive effect on the identification. This identification can then be used to initiate safety-critical situations, for example if autonomously driving motor vehicles are driving on unknown roads, wherein appropriate responses which avoid the safety-critical situation can be initiated on the basis of this identification.

A further embodiment additionally also specifies a system for determining whether a motor vehicle has driven on a road included in digital map material, wherein the system has an electronic control unit described above, an absolute positioning system for capturing the first and the further absolute position data, an odometry system of the motor vehicle for capturing the first and the further vehicle odometry data and a memory in which the digital map material is stored.

A system is therefore specified having an electronic control unit which makes it possible for new roads not included in digital map material to also be able to be reliably identified when the distance between the new road not included in the digital map material and a road included in the digital map material is short. As a result of the fact that vehicle odometry data are also used in addition to absolute position data to identify roads not included in the digital map material, for example newly constructed roads, the identification accuracy when identifying such roads can be increased considerably, in particular in those situations in which a new or unknown road runs in the vicinity of a known road included in the digital map material. The reason for this improvement is that the vehicle odometry has a considerably higher degree of accuracy of the distance covered than the absolute positions. In particular, the electronic control unit makes it possible in the first place to automatically identify new, unknown roads which run in the vicinity of known roads included in the digital map material. In addition, the fact that errors of successive absolute positions, for example GNSS positions, are not independent of one another, but rather the positions often have a constant offset, has a positive effect on the identification. This identification can then be used to initiate safety-critical situations, for example if autonomously driving motor vehicles are driving on unknown roads, wherein appropriate responses which avoid the safety-critical situation can be initiated on the basis of this identification.

In summary, it can be stated that the present subject matter specifies a method for determining whether a motor vehicle has driven on a road included in digital map material, which method makes it possible for new roads not included in digital map material to also be able to be reliably identified when the distance between the new road not included in the digital map material and a road included in the digital map material is short.

In particular, the specified method makes it possible in the first place to automatically identify new, unknown roads which run in the vicinity of known roads included in the digital map material.

The specified identification can also be used to initiate safety-critical situations, for example if autonomously driving motor vehicles are driving on unknown roads, wherein appropriate responses which avoid the safety-critical situation can be initiated on the basis of this identification.

The method may also be designed in such a manner that it is possible to determine in a simple manner with little computing power and a short computing duration, which is necessary in order to be able to react as immediately as possible to safety-critical situations, whether the motor vehicle is driving on a road included in the digital map material.

The present subject matter is now explained in more detail on the basis of the accompanying figures.

Other objects, advantages and novel features of the present subject matter will become apparent from the following detailed description of one or more preferred embodiments when considered in conjunction with the accompanying drawings.

DETAILED DESCRIPTION OF THE DRAWINGS

Figure 1:
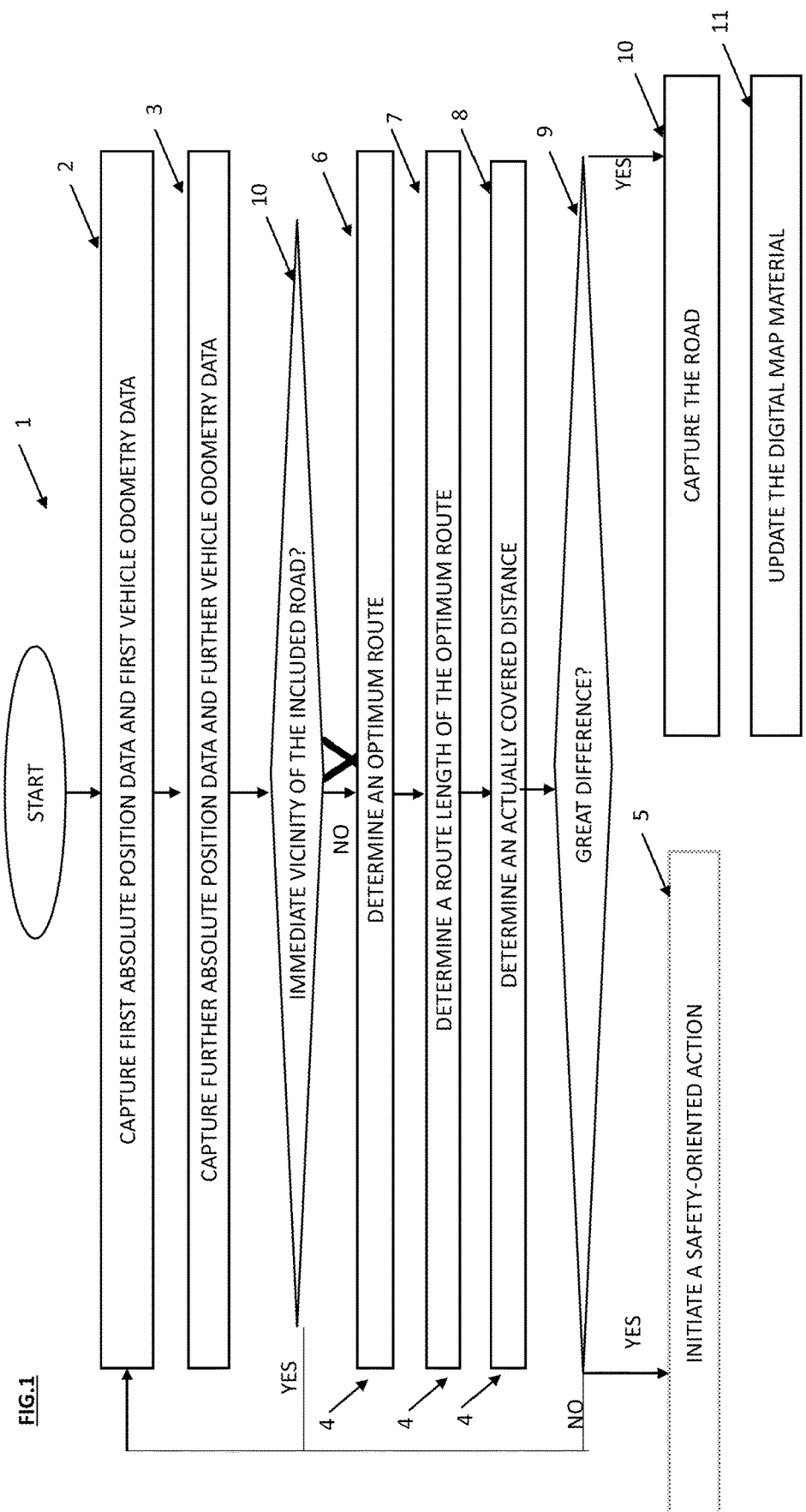
FIG. 1 shows a flowchart of a method for determining whether a motor vehicle has driven on a road included in digital map material according to embodiments of the present subject matter.

FIG. 1 shows a flowchart of a method 1 for determining whether a motor vehicle has driven on a road included in digital map material according to embodiments of the present subject matter.

As shown in FIG. 1, the method 1 in this case has a step 2 of capturing first absolute position data relating to the motor vehicle using an absolute positioning system and first vehicle odometry data using an odometry system of the motor vehicle at a first point in time during operation of the motor vehicle and a step 3 of capturing further absolute position data relating to the motor vehicle using the absolute positioning system and further vehicle odometry data using the odometry system at at least one further point in time during operation of the motor vehicle which differs from the first point in time. In a further step 4, it is then determined whether the motor vehicle has driven on a road included in digital map material on the basis of the digital map material, the first absolute position data, the first vehicle odometry data, the further absolute position data and the further vehicle odometry data.

Data from an absolute positioning system of a motor vehicle, for example position data obtained using a global navigation satellite system (GNSS), are usually used to identify whether the motor vehicle is on or has travelled on a road included in digital map material and/or to identify new roads previously not included in the digital map material. The vehicle positions determined using a GNSS receiver are mapped in this case to the road network of the digital map, for example using map-matching methods. However, the disadvantage of this is that, as a result, unknown roads not included in the digital map material can only be reliably identified when they are at a great distance of more than 100 m, for example, from already known roads included in the digital map material. However, if the distance to known roads is short and is less than 100 m, for example, it is not possible to reliably determine whether the motor vehicle is on or has been on a road included in the digital map material.

As a result of the fact that vehicle odometry data are also used in addition to absolute position data to identify roads not included in the digital map material, for example newly constructed roads, the identification accuracy when identifying such roads can now be increased considerably, in particular in those situations in which a new or unknown road runs in the vicinity of a known road included in the digital map material and, in particular, the distance between the two roads is less than 100 m. The reason for this improvement is that the vehicle odometry has a considerably higher degree of accuracy of the distance covered than the absolute positions. In particular, the method 1 makes it possible in the first place to automatically identify new, unknown roads which run in the vicinity of known roads included in the digital map material. In addition, the fact that errors of successive absolute positions, for example GNSS positions, are not independent of one another, but rather the positions often have a constant offset, as a positive effect on the identification. This identification can then be used to initiate safety-critical situations, for example if autonomously driving motor vehicles are driving on unknown roads, wherein appropriate responses which avoid the safety-critical situation can be initiated on the basis of this identification.

Step 4 of determining whether the motor vehicle has driven on a road included in digital map material can be carried out in this case on a host or server, for example a server belonging to a provider which provides the digital map material and to which the absolute position data and the vehicle odometry data have been transmitted. However, this step may furthermore also be carried out by an electronic control unit integrated in the motor vehicle if the corresponding control unit has the necessary computing capacities.

The digital map material may likewise be saved and stored in the motor vehicle itself or only on a host or server, for example a server belonging to a provider which provides the digital map material.

The optimum parameters of the method 1 are also dependent on the measurement accuracy of the absolute positioning system and the accuracy of the odometry measurement. In order to determine the optimum parameters, a portion may be removed from a digital map, for example, and the method of operation of the method 1 can be tested using historical vehicle trajectories. The F-measure, which combines the accuracy and hit rate of newly identified roads with one another, can be used in this case as the metric for the quality of the method.

According to the embodiments in FIG. 1, the method also has a step 5 of initiating a safety-oriented action if it is determined that the motor vehicle is not driving on a road included in the digital map material. For example, appropriate warnings can be output in order to accordingly warn the driver of the motor vehicle and to increase his attentiveness to the situation, or the functions of individual driver assistance systems can be restricted or deactivated, for example autonomous driving functions can be deactivated on unknown roads not included in the digital map material.

As shown in FIG. 1, step 4 of determining whether the motor vehicle is driving on a road included in the digital map material on the basis of the digital map material, the first absolute position data, the first vehicle odometry data, the further absolute position data and the further vehicle odometry data has a step 6 of determining an optimum route between a position indicated by the first absolute position data and a position indicated by second absolute position data on the basis of the digital map material, wherein the second absolute position data are included in the further absolute position data, a step 7 of determining a route length of the optimum route, and a step 8 of determining an actually covered distance on the basis of the first vehicle odometry data and second vehicle odometry data, wherein the second vehicle odometry data were captured at the same point in time as the second absolute position data. A step 9 then determines whether the motor vehicle is driving on a road included in the digital map material by comparing the route length with the actually covered distance, wherein the motor vehicle is not driving on a road included in the digital map material if the route length differs greatly from the actually covered distance.

The optimum route may be in this case, in particular, a shortest or quickest route between the position indicated by the first absolute position data and the position indicated by the second absolute position data, as determined by a navigation system on the basis of the digital map material. In this case, it is advantageous to determine the quickest route if the positions corresponding to the first and the second absolute position data have a large interval of time and are at a large spatial distance from one another. Furthermore, the quickest route can be calculated, for example, using average historical journey times which are stored in the digital map or the digital map material.

According to the embodiments in FIG. 1, the route length differs greatly from the actually covered distance in this case if a difference between the route length and the actually covered distance is greater than or equal to 20 m.

Furthermore, further absolute position data and further vehicle odometry data are captured every 10 s after the first point in time. In this case, it should be noted, in particular, that, if the absolute position data or vehicle position data were captured at a higher frequency, in particular an excessively high frequency, for example of 1 Hz, the inaccuracies in the measurement of the vehicle positions, in particular the longitudinal offset of the measured position with respect to the actual position on the road, would be of greater significance.

As can be seen, the method 1 also has step 10 of checking whether the first and the further absolute position data each indicate positions which are in the immediate vicinity of a road included in the digital map material, wherein step 4 of determining whether the vehicle has driven on a road included in the digital map material is carried out only if the first and the further absolute position data do not each indicate positions which are in the immediate vicinity of a road included in the digital map material. However, if it is determined that the first and the further absolute position data each indicate positions which are in the immediate vicinity of a road included in the digital map material, the method 1, according to the embodiments in FIG. 1, returns to step 2 of capturing first absolute position data relating to the motor vehicle using an absolute positioning system and capturing first vehicle odometry data using an odometry system of the motor vehicle at a first point in time during operation of the motor vehicle. However, it should be noted that, as stated above, in the embodiments according to FIG. 1, further absolute position data and further vehicle odometry data are captured every 10 s after the first point in time even if the first and the further absolute position data do not each indicate positions which are in the immediate vicinity of a road included in the digital map material.

As shown in FIG. 1, the method 1 also here has a step 10 of capturing a road on which the motor vehicle has actually driven if it is determined that the motor vehicle has not driven on a road included in the digital map material, and a step 11 of updating the digital map material on the basis of the capture of the road on which the motor vehicle has actually driven.

The fact that the road on which the first motor vehicle has actually driven is captured in this case means that this is measured using further measures in order to then be entered in the digital map material. In this case, motor vehicles having further sensors, for example a Differential Global Positioning System (DPGS), can be used for the accurate measurement, for example.

In particular, the digital map material can be updated in this case if it is determined that at least one further vehicle has also driven on the road on which the first motor vehicle has actually driven and it is determined that the at least one further motor vehicle has driven on a road not included in the digital map material. A good indicator of a new road not included in the digital map material is in this case, for example, the fact that this road has been "identified" more than 10 times within a week.

Figure 2:
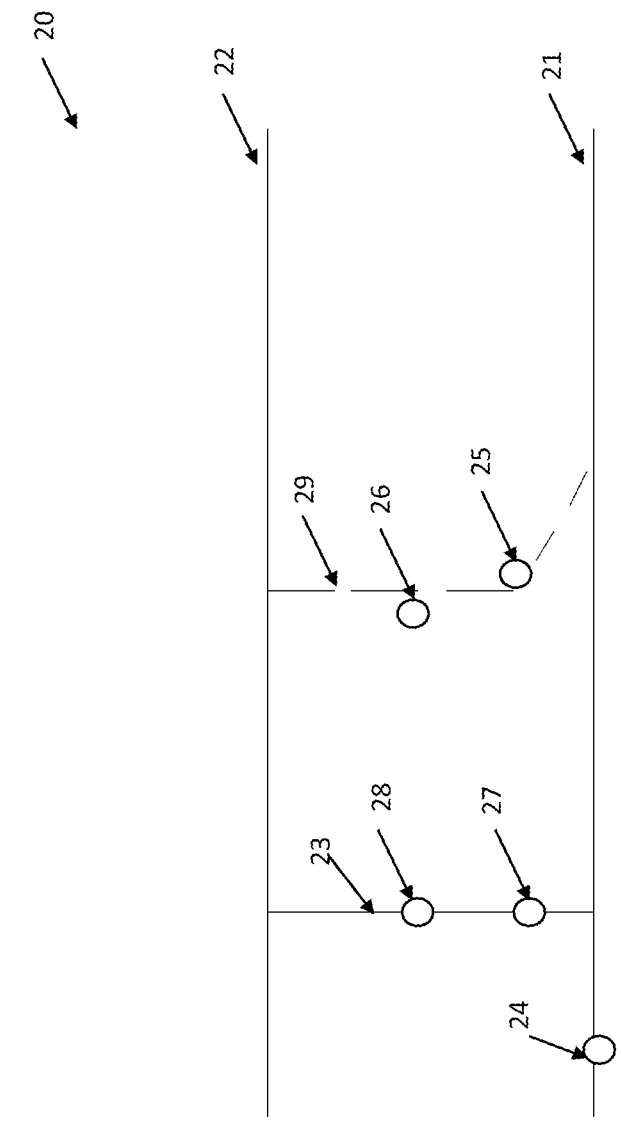
FIG. 2 illustrates a method for determining whether a motor vehicle has driven on a road included in digital map material according to one embodiment of the present subject matter.

FIG. 2 illustrates a method 20 for determining whether a motor vehicle has driven on a road included in digital map material according to one embodiment of the present subject matter.

In this case, FIG. 2 shows two roads 21, 22 which run in a parallel manner and are included in the digital map material and a connecting road 23 which connects the two roads 21, 22 and is likewise included in the digital map system.

In this case, a motor vehicle is at the position one provided with reference sign 24 at a point in time $t_1$, is at the position two provided with reference sign 25 at a subsequent point in time $t_2$ and is at the position three provided with reference sign 26 at a subsequent point in time $t_3$. Furthermore, absolute position data relating to the motor vehicle and vehicle odometry data are respectively captured at the points in time $t_1$, $t_2$ and $t_3$.

The captured absolute position data are then mapped to the road material included in the digital map material using a map-matching component, wherein this results in it being assumed that the motor vehicle was at the position four provided with reference sign 27 on the connecting road 23 included in the digital map material at the point in time $t_2$ and was at the position five provided with reference sign 28 on the connecting road 23 included in the digital map material at the point in time $t_3$.

The route length of the shortest route between the positions one and five, which runs via the position four, is then determined, wherein this is 100 m in the example embodiment in FIG. 2. In addition, a distance actually covered between the positions one and three is determined from the captured vehicle odometry data, wherein this actually covered distance is 122 m in the example embodiment in FIG. 2.

The route length therefore differs greatly from the actually covered distance, in particular by more than 20 m, which may be an indicator of the fact that the motor vehicle is on a new road not included in the digital map material. The new road not included in the digital map material is symbolized in this case by the dashed line provided with reference sign 29 in FIG. 2.

Figure 3:
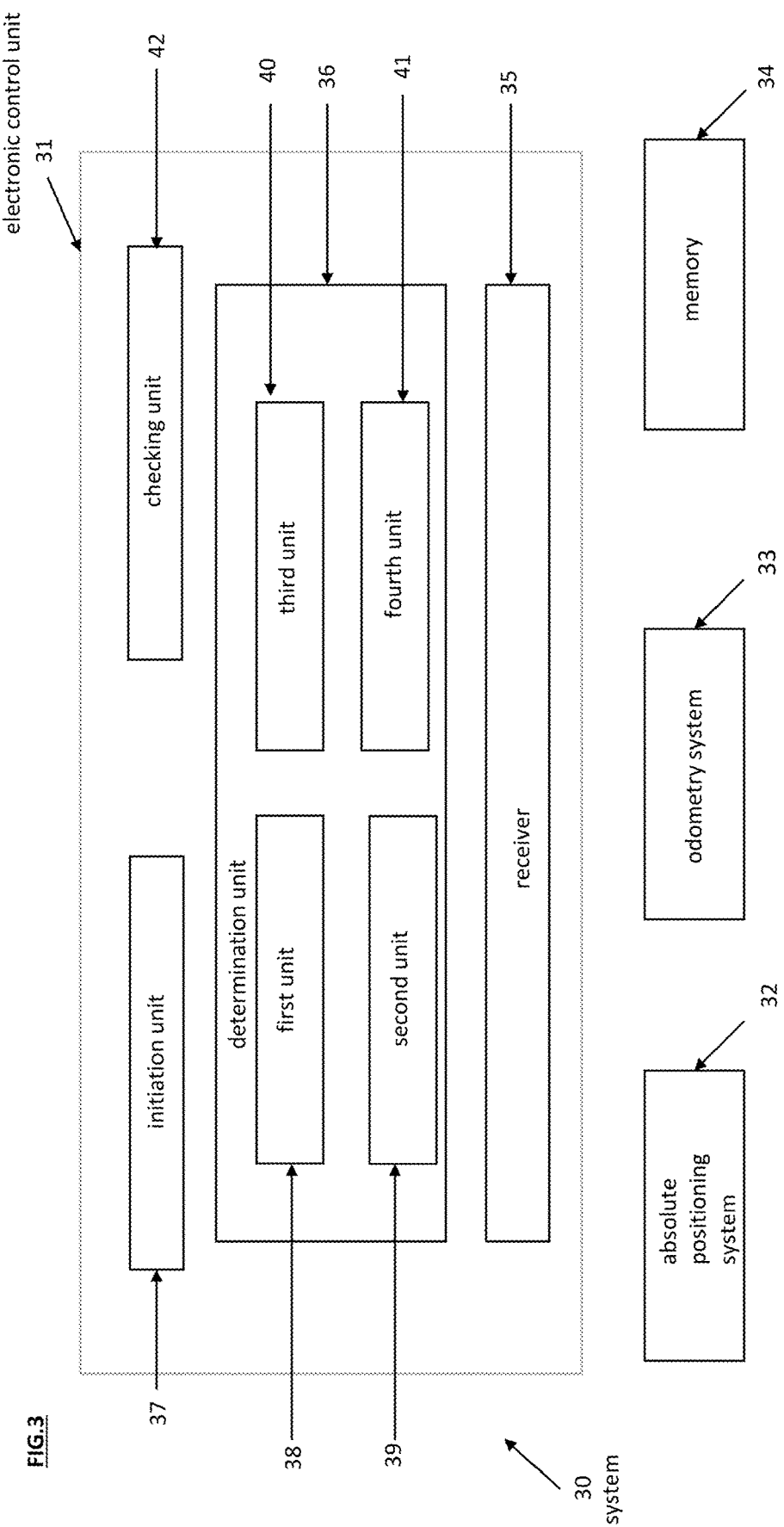
FIG. 3 shows a system for determining whether a motor vehicle has driven on a road included in digital map material according to embodiments of the present subject matter.

FIG. 3 shows a system 30 for determining whether a motor vehicle has driven on a road included in digital map material according to embodiments of the present subject matter.

As shown in FIG. 3, the system in this case has an electronic control unit 31 for determining whether a motor vehicle has driven on a road included in the digital map material, an absolute positioning system 32, an odometry system 33 of the motor vehicle and a memory 34 in which the digital map material is stored.

Absolute position data indicate the measured position of the motor vehicle at a particular point in time in absolute values, for example in a UTM or WGS84 reference coordinate system. Optionally, the absolute position data may furthermore also be provided in this case with an orientation indicating, for example, a current direction of movement of the motor vehicle. A combination of position and orientation is often referred to as a pose in this case. The absolute positioning system 32 may be in this case, for example, satellite-based technologies, for example a Global Positioning System (GPS) or GNSS.

In the case of motor vehicles, odometry is also understood as meaning a functionality which determines the position, orientation and driving state of the motor vehicle at particular points in time. In this case, measurement variables from the chassis, for example wheel rotation and direction, of the yaw rate sensor and of the steering system, for example wheel steering angle or steering wheel angle, are generally used as input variables. In vehicle navigation, odometry is used in addition to determining an absolute position in order to bridge regions without reception, such as tunnel sections, and to refine the GPS results. In this case, an odometry system 33 is also understood as meaning a system for capturing the corresponding input variables, for example the input variables cited above.

The memory 34 may be a non-transitory, computer-readable storage memory, for example a random access memory (RAM), read-only memory (ROM), flash memory, a hard disk, or any other device capable of storing electronic information.

According to the embodiments in FIG. 3, the electronic control unit 31 for determining whether a motor vehicle has driven on a road included in digital map material has a receiver 35 which is designed to receive absolute position data relating to the motor vehicle which are captured by the absolute positioning system 32 at a first point in time during operation of the motor vehicle, vehicle odometry data relating to the motor vehicle which are captured at the first point in time, absolute position data which are captured at at least one further point in time during operation of the motor vehicle which differs from the first point in time and vehicle odometry data which are captured at the at least one further point in time, and a determination unit 36 which is designed to determine whether the motor vehicle has driven on a road included in digital map material on the basis of the digital map material, the first absolute position data, the first vehicle odometry data, the further absolute position data and the further vehicle odometry data as well as a map-matching algorithm.

The receiver 35 may be, for example, a transceiver in this case. The determination unit 36 may also be a computer which stores appropriate code, for example a server or an electronic control unit of the motor vehicle, more specifically, a computer integrated in the motor vehicle itself. In some configurations, a set of computer-readable instructions stored on a computer-readable storage medium can be implemented by computer having a general-purpose processor, which can transform the general-purpose processor or a device containing the general-purpose processor into a special-purpose device configured to implement or carry out the instructions. Embodiments can be implemented using hardware that can include a processor, such as a general-purpose microprocessor and/or an Application Specific Integrated Circuit (ASIC) that embodies all or part of the techniques according to embodiments of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to embodiments of the disclosed subject matter.

As shown in FIG. 3, the illustrated electronic control unit 31 furthermore also has an initiation unit 37 which is designed to initiate a safety-oriented action if it is determined in the determination unit 36 that the motor vehicle has not driven on a road included in the digital map material. The initiation unit 37 may be in this case, for example, a warning device in order to output appropriate warnings in order to accordingly warn the driver of the motor vehicle and to increase the driver's attentiveness to the situation, or an actuator which is designed to restrict or deactivate the functions of individual driver assistance systems, for example to deactivate autonomous driving functions on unknown roads not included in the digital map material.

According to the embodiments in FIG. 3, the determination unit 36 furthermore also has a first unit 38 which is designed to determine an optimum route between a position indicated by the first absolute position data and a position indicated by second absolute position data on the basis of the digital map material, wherein the second absolute position data are included in the further absolute position data, a second unit 39 which is designed to determine a route length of the optimum route on the basis of the digital map material, a third unit 40 which is designed to determine an actually covered distance on the basis of the first vehicle odometry data and second vehicle odometry data, wherein the second vehicle odometry data are captured at the same point in time as the second absolute position data, and a fourth unit 41 which is designed to determine whether the motor vehicle is driving on a road included in the digital map material by comparing the route length with the actually covered distance, wherein the fourth unit 41 is designed to determine that the motor vehicle is not driving on a road included in the digital map material if the route length differs greatly from the actually covered distance.

The first unit 38 and the second unit 39 may be in this case, for example, respective corresponding units of a vehicle navigation system. The third unit 40 and the fourth unit 41 may furthermore each again be a computer which stores appropriate code, for example a server or an electronic control unit of the motor vehicle, more specifically, a computer integrated in the motor vehicle itself. In some configurations, a set of computer-readable instructions stored on a computer-readable storage medium can be implemented by a computer having a general-purpose processor, which can transform the general-purpose processor or a device containing the general-purpose processor into a special-purpose device configured to implement or carry out the instructions. Embodiments can be implemented using hardware that can include a processor, such as a general-purpose microprocessor and/or an Application Specific Integrated Circuit (ASIC) that embodies all or part of the techniques according to embodiments of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to embodiments of the disclosed subject matter.

According to the embodiments in FIG. 3, the electronic control unit 31 also has a checking unit 42 which is designed to check whether the first and the further absolute position data each indicate positions which are in the immediate vicinity of a road included in the digital map material, wherein the determination unit 36 is designed only to determine whether the motor vehicle has driven on a road included in the digital map material if the first and the further absolute position data each do not indicate positions which are in the immediate vicinity of a road included in the digital map material.

The checking unit 42 may again in this case be a computer which stores appropriate code, for example a server or an electronic control unit of the motor vehicle, more specifically, a computer integrated in the motor vehicle itself. In some configurations, a set of computer-readable instructions stored on a computer-readable storage medium can be implemented by a computer having a general-purpose processor, which can transform the general-purpose processor or a device containing the general-purpose processor into a special-purpose device configured to implement or carry out the instructions. Embodiments can be implemented using hardware that can include a processor, such as a general-purpose microprocessor and/or an Application Specific Integrated Circuit (ASIC) that embodies all or part of the techniques according to embodiments of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as can be suited to the particular use contemplated.

What is claimed is:

1. A method for determining whether a motor vehicle has driven on a road included in digital map material, wherein the method comprises the following steps:
    capturing first absolute position data relating to the motor vehicle using an absolute positioning system and capturing first vehicle odometry data using an odometry system of the motor vehicle at a first point in time during operation of the motor vehicle;
    capturing further absolute position data relating to the motor vehicle using the absolute positioning system and capturing further vehicle odometry data using the odometry system at one further point in time during operation of the motor vehicle which differs from the first point in time;
    determining whether the motor vehicle has driven on the road included in the digital map material based on the digital map material, the first absolute position data, the first vehicle odometry data, the further absolute position data, the further vehicle odometry data, and a map-matching algorithm; and
    deactivating an autonomous driving function of the motor vehicle in response to a determination that the motor vehicle has not driven on the road included in the digital map material.

2. The method according to claim 1, wherein the step of determining whether the motor vehicle has driven on the road included in the digital map material comprises:
    determining an optimum route between a position of the motor vehicle indicated by the first absolute position data and a position of the motor vehicle indicated by second absolute position data based on the digital map material, wherein
        the second absolute position data are included in the further absolute position data;
    determining a route length of the optimum route based on the digital map material;
    determining an actually covered distance based on the first vehicle odometry data and second vehicle odometry data, wherein
        the second vehicle odometry data were captured at the same point in time as the second absolute position data; and
    determining whether the motor vehicle has driven on the road included in the digital map material by comparing the route length with the actually covered distance, wherein
        it is determined that the motor vehicle has not driven on the road included in the digital map material if the route length differs greatly from the actually covered distance.

3. The method according to claim 2, wherein the route length differs greatly from the actually covered distance when a difference between the route length and the actually covered distance is greater than or equal to 20 m.

4. The method according to claim 1, wherein further absolute position data and further vehicle odometry data are captured every 10 seconds after the first point in time during operation of the motor vehicle.

5. The method according to claim 1, further comprising:
    checking whether the first and the further absolute position data each indicate positions which are in an immediate vicinity of the road included in the digital map material, wherein
        the step of determining whether the motor vehicle has driven on the road included in the digital map material is carried out only if the first and the further absolute position data do not each indicate positions which are in the immediate vicinity of the road included in the digital map material.

6. A method for updating digital map material, wherein the method comprises the following steps:
    determining whether a first motor vehicle has driven on the road included in digital map material by carrying out the method of claim 1; and
    capturing a road on which the first motor vehicle has actually driven if it is determined that the first motor vehicle has not driven on the road included in the digital map material; updating the digital map material based on the road on which the first motor vehicle has actually driven.

7. The method according to claim 6, wherein
the digital map material is updated in response to determining that at least one further motor vehicle has also driven on the road on which the first motor vehicle has actually driven and it has been determined that the at least one further motor vehicle has driven on a road not included in the digital map material.

8. An electronic control unit for determining whether a motor vehicle has driven on a road included in digital map material, comprising:
a receiver configured to receive:
first absolute position data relating to the motor vehicle which are captured at a first point in time during operation of the motor vehicle,
first vehicle odometry data relating to the motor vehicle which are captured at the first point in time,
further absolute position data which are captured at one further point in time during operation of the motor vehicle which differs from the first point in time, and
further vehicle odometry data which are captured at the at least one further point in time,
a processor; and
a memory in communication with the processor, the memory storing a plurality of instructions executable by the processor to cause the electronic control unit to:
determine whether the motor vehicle has driven on the road included in the digital map material based on the digital map material, the first absolute position data, the first vehicle odometry data, the further absolute position data, the further vehicle odometry data, and a map-matching algorithm; and
deactivate an autonomous driving function of the motor vehicle in response to a determination that the motor vehicle has not driven on the road included in the digital map material.

9. The electronic control unit according to claim 8, wherein the memory further comprises instructions executable by the processor to cause the electronic control unit to:
determine an optimum route between a position of the motor vehicle indicated by the first absolute position data and a position of the motor vehicle indicated by second absolute position data based on the digital map material, wherein
the second absolute position data are included in the further absolute position data,
determine a route length of the optimum route based on the digital map material,
determine an actually covered distance based on the first vehicle odometry data and second vehicle odometry data, wherein
the second vehicle odometry data are captured at the same point in time as the second absolute position data, and
determine whether the motor vehicle has driven on the road included in the digital map material by comparing the route length with the actually covered distance, and
determine that the motor vehicle has not driven on the road included in the digital map material if the route length differs greatly from the actually covered distance.

10. The electronic control unit according to claim 9, wherein
the route length differs greatly from the actually covered distance if a difference between the route length and the actually covered distance is greater than or equal to 20 m.

11. The electronic control unit according to claim 8, wherein the memory further comprises instructions executable by the processor to cause the electronic control unit to:
check whether the first and the further absolute position data each indicate positions which are in an immediate vicinity of the road included in the digital map material, and
determine whether the motor vehicle has driven on the road included in the digital map material if the first and the further absolute position data each do not indicate positions which are in the immediate vicinity of the road included in the digital map material.

12. A motor vehicle having the electronic control unit according to claim 8.

13. A system for determining whether the motor vehicle has driven on a road included in digital map material, comprising:
the electronic control unit according to claim 8;
an absolute positioning system configured to capture absolute position data relating to the motor vehicle;
an odometry system of the motor vehicle configured to capture vehicle odometry data relating to the motor vehicle; and
the memory is further configured to store the digital map material.

14. The method according to claim 1, further comprising:
deactivating the autonomous driving function of the motor vehicle in response to determining that the motor vehicle is traveling on an unknown road not included in the digital map material.

15. The electronic control unit according to claim 8, wherein the memory further comprises instructions executable by the processor to cause the electronic control unit to:
deactivate an autonomous driving function of the motor vehicle in response to determining that the motor vehicle is traveling on an unknown road not included in the digital map material.

* * * * *